2,796,324

STABILIZED SODIUM ACID PYROPHOSPHATE OF IMPROVED DOUGHNUT BAKING PROPERTIES AND METHOD OF PRODUCING SAME

Cecil H. Russell, Trenton, Mich., assignor to Monsanto Chemical Company, St. Louis, Mo., a corporation of Delaware No Drawing. Application April 2, 1952, Serial No. 280,184

4 Claims. (Cl. 23—106)

The present invention relates to a fast reacting sodium acid pyrophosphate and to a novel method of producing same.

The principal object of the invention is to provide sodium acid pyrophosphate having a combination of properties which render it eminently suitable for use in the production of doughnuts.

Another object is to provide sodium acid pyrophosphate having a reaction rate of 32 to 40 and preferably from 34 to 38, inclusive.

A further object is to provide sodium acid pyrophosphate having a reaction rate within the above range, which does not increase more than 5%, and preferably not more than 3%, when the above product is subjected to 66% R. H. and a temperature of 90° F. for a period of 8 days.

A still further object is to provide a novel method of producing sodium acid pyrophosphate having the above desirable properties.

Other objects and advantages will become apparent to those skilled in the art as the description proceeds.

The preparation of uniform doughnuts of good color and texture with low grease soaking properties, regular flutes and plump well rounded walls requires sodium acid pyrophosphate with a special combination of properties.

For example, if the above leavening acid has a reaction rate which is too slow, i. e., below 32, doughnuts prepared from doughnut mixes containing same are deformed and have a cracked surface which impairs their appearance. Moreover, the cracked surfaces of the doughnuts permit excessive grease absorption which has a deleterious effect on their palatability. On the other hand, if the reaction rate of the sodium acid pyrophosphase is too fast, i. e., above 40, the doughnuts are deformed, flat and spongy in character with the result that they absorb excessive quantities of grease which substantially impairs their appearance and palatability.

While a fast reaction rate is an essential property of a satisfactory leavening acid for baking doughnuts, it is not the only factor which determines the utility of sodium acid pyrophosphate for the above purpose. For example, a sodium acid pyrophosphate may have a reaction rate within the range of 32 to 40 and still not yield satisfactory doughnuts; in order to perform this function satisfactorily and at the same time possess the desired stability to change in reaction rate, it must contain the aluminum and alkali metal oxide impurities disclosed in Patent 2,408,258 to Eugene N. Hetzel et al., and be treated in the manner hereinafter described.

In accordance with the present invention, a method of treating "stabilized sodium acid pyrophosphate" has been developed whereby a relatively stable, fast reacting product is obtained which is eminently suitable for use in the baking of doughnuts.

"Stabilized sodium acid pyrophosphate" is the product disclosed and claimed in the above-mentioned patent to Eugene N. Hetzel et al., and for the sake of convenience, it will be hereinafter designated in the specification and claims by the above expression.

Briefly stated, the above method involves treating stabilized sodium acid pyrophosphate with substantially 100% by volume of steam under pressure and at the corresponding temperature, followed by aging at room temperature, final grinding, and sizing.

The steam treatment is carried out for a period of about 0.25 to about 10 minutes depending upon the steam pressure which may vary within the limits of about 0.5 to about 10 lbs. per square inch, and preferably within the limits of about 3 lbs. to about 5 lbs. per square inch. In general, the higher the steam pressure the shorter is the time of treatment required to yield a product having a given reaction rate within the limits of about 32 to 40, and vice versa.

Upon completing the above treatment, the product is aged for about 8 hours to about 48 hours and preferably for about 24 hours at room temperature.

The aged product is then milled to a fineness permitting at least 75% by weight of the material to pass through a 325 mesh screen. More particularly, the product is ground to meet the following specifications:

SCREEN SIZE (U. S. STANDARD SIEVES)

| | |
|---|---|
| CR (cumulative retained) 80 | 0–0.1 |
| CR (cumulative retained) 100 | 0–0.5 |
| CR (cumulative retained) 325 | 10–25.0 |

The invention will be further illustrated by the following specific examples. However, it should be understood that these examples are given primarily for purposes of illustration, and the invention in its broader aspects is not limited thereto.

Example I

The apparatus used to treat the sodium acid pyrophosphate in accordance with this example consisted of a gas heated pressure vessel provided with a valve controlled steam outlet, a container of water located in the bottom thereof for supplying a source of steam and a shelf for supporting a plate carrying the sample of sodium acid pyrophosphate to be treated.

Before subjecting the sodium acid pyrophosphate to steam pressure, the pressure vessel was heated with the steam outlet valve open until steam was escaping from the vessel. The pressure vessel was then quickly opened, the plate carrying the sample of sodium acid pyrophosphate was inserted and then the vessel and the steam outlet valve were quickly closed. Upon completing these operations, heat was applied until the desired steam pressure was obtained, which pressure was maintained for a predetermined length of time. At the end of the predetermined pressure interval, the heat was turned off and the steam outlet valve was opened slightly until the pressure vessel was restored to atmospheric pressure. Then the vessel was opened while still steaming and the sodium acid pyrophosphate sample removed.

Approximately 50 to 100 grams of stabilized sodium acid pyrophosphate was spread out on the above-mentioned plate in a layer of approximately ⅛ inch thick, the salt being evenly distributed on the plate by dusting through a 20 mesh screen. The plate including the sample of sodium acid pyrophosphate was introduced into the pressure vessel in the manner described above and the salt subjected to an atmosphere of steam at a pressure of about 5 lbs./in.$^2$ for about 10 minutes.

After the steaming treatment, the sample was aged for 48 hours at room temperature, whereupon it was milled to the required particle size.

The dough reaction rate for the product produced in the above manner was 38.5.

Example II

The above procedure was repeated for 5 minutes, using a steam pressure of about 1 lb. per square inch and a product was obtained having a reaction rate of 35.1.

The product of Example I was evaluated from the standpoint of its doughnut leavening properties, and it was found to be markedly superior to stabilized sodium acid pyrophosphate. For example, when a typical untreated sample of stabilized sodium acid pyrophosphate and the product of Example I were used with a commercially prepared doughnut mix in the baking of doughnuts, the following results were obtained:

| Sodium Acid Pyrophosphate | Dough Reaction Rate | Baking Score |
|---|---|---|
| Untreated Sample | 27.5 | 44.7 |
| Sample of Example I | 38 | 88 |

A doughnut having a total score of at least 60 is deemed satisfactory while the converse of this is true of doughnuts having a baking score below the above value. Therefore, it is evident from the above data that the steam treatment described herein converts "stabilized sodium acid pyrophosphate" into a product which is eminently suitable for use in baking doughnuts.

In arriving at the above baking scores, the appearance of the up side and down side of the doughnuts is taken into consideration. The former is considered the more important of the two and is given a total rating of 65, whereas the latter is assigned a total rating of 35. The above total ratings are broken down as follows:

UP SIDE OF DOUGHNUT

| | |
|---|---|
| Dishing | 30 |
| Breaks | 10 |
| Color | 5 |
| Surface texture | 20 |
| Total | 65 |

DOWN SIDE OF DOUGHNUT

| | |
|---|---|
| Flutes | 20 |
| Breaks | 10 |
| Blisters | 5 |
| Total | 35 |

The above method, although qualitative in nature, constitutes a very convenient and practical means of evaluating the effectiveness of a given leavening acid in the baking of doughnuts and the results obtained by those skilled in the art in applying this test agree quite closely.

As pointed out earlier herein, the stabilized sodium acid pyrophosphate disclosed and claimed in Patent 2,408,258 to Eugene N. Hetzel et al. is employed as the starting material in the practice of the instant invention and its initial reaction rate varies within the range of about 25 to 30 depending upon its content of alkali metal oxide and $Al_2O_3$ impurities. Therefore, the hereinbefore described operating conditions will vary to some extent with the initial reaction rate of the stabilized sodium acid pyrophosphate to be treated.

The products of the instant invention are admirably suitable for use in the baking of doughnuts, giving a baking score of 60 to about 90. Moreover, they are characterized by excellent stability to change in reaction rate. For example, they do not vary in this respect more than 5% and usually not more than 3% when subjected to 66% R. H. and a temperature of 90° F. for a period of 8 days. This is important since in practice the above products are not used immediately after they are prepared.

The dough reaction rate as used in the present specification is the amount of carbon dioxide evolved from moist dough leavened with sodium acid pyrophosphate during the first 8 minutes at a temperature of 27° C. For example, if the above compound in a leavening composition containing sodium bicarbonate liberates at 27° C. about 35% of the contained carbon dioxide over a period of 8 minutes, it exhibits a reaction rate of 35. For a more detailed discussion of dough reaction rate, reference is made to "Cereal Chemistry," vol. 8, page 423, of 1931.

The ignition loss as used in the present specification is the percentage by weight of volatile material liberated by heating the dried sodium acid pyrophosphate products at a temperature of 800° C. for 30 minutes.

While the invention has been described in a detailed manner with illustrated suitable modes of executing same, it is to be understood that modifications may be made and that no limitations other than those imposed by the scope of the appended claims are intended.

What I claim is:

1. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$; which consists in subjecting said sodium acid pyrophosphate in a closed container to an atmosphere consisting of substantially 100% by volume of steam at a pressure of from about 0.5 to about 10 lbs. per square inch, aging the resulting product at room temperature for about 8 hours to about 48 hours and then milling the aged product to a fineness permitting at least 75% by weight of the material to pass through a 325 mesh screen, said steam treatment being carried out for about 10 minutes to about 0.25 minute and thereafter removing the said heated material from the said closed container.

2. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$; which consists in subjecting said sodium acid pyrophosphate in a closed container to an atmosphere consisting of substantially 100% by volume of steam at a pressure of approximately 1 lb. per square inch, aging the resulting product at room temperature for about 48 hours and then milling the aged product to a fineness permitting at least 75% by weight of the material to pass through a 325 mesh screen, said steam treatment being carried out for a period of about 5 minutes and thereafter removing the said treated material from the said closed container.

3. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$; which consists in subjecting said sodium acid pyrophosphate in a closed container to an atmosphere consisting of substantially 100% by volume of steam at a pressure of about 5 lbs per square inch, aging the resulting product at room temperature for about 48 hours and then milling the aged product to a fineness permitting at least 75% by weight of the material to pass through a 325 mesh screen, said steam treatment being carried out for about 10 minutes and thereafter removing the said treated material from the said closed container.

4. The method of preparing sodium acid pyrophosphate having substantially improved doughnut baking properties from sodium acid pyrophosphate prepared by thermally evaporating a monosodium orthophosphate solution within a period of less than 12 seconds to produce substantially dry $NaH_2PO_4$, heating said $NaH_2PO_4$, in an atmosphere containing water vapor at a partial pressure of about 100 mm. to about 140 mm. of mercury, to a temperature of about 225° C. to about 235° C. until sodium acid pyrophosphate has been formed and thereafter tempering said pyrophosphate by maintaining it at a temperature of about 225° C. to about 235° C. for a period of about 4 to about 6 hours, said sodium orthophosphate solution containing about 0.10% to about 0.20% $K_2O$ and about 0.025% to about 0.075% $Al_2O_3$, basis $NaH_2PO_4$; which consists in subjecting said sodium acid pyrophosphate in a closed container to an atmosphere consisting of substantially 100% by volume of steam at a pressure of from about 0.5 to about 10 lbs. per square inch, aging the resulting product at room temperature for about 24 hours and then milling the aged product to a fineness permitting at least 75% by weight of the material to pass through a 325 mesh screen, said steam treatment being carried out for a period of about 10 minutes to about 0.25 minute.

References Cited in the file of this patent

UNITED STATES PATENTS

| | | |
|---|---|---|
| 2,408,258 | Hetzel | Sept. 24, 1946 |
| 2,636,808 | Hubbard et al. | Apr. 28, 1953 |

FOREIGN PATENTS

| | | |
|---|---|---|
| 461,871 | Great Britain | Nov. 2, 1935 |